United States Patent
Rasmussen

(10) Patent No.: US 7,639,730 B2
(45) Date of Patent: Dec. 29, 2009

(54) METHODS AND APPARATUS FOR IMPROVING SIGNAL TIMING ACCURACY

(75) Inventor: Donald Rasmussen, Fort Wayne, IN (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 673 days.

(21) Appl. No.: 11/378,625

(22) Filed: Mar. 20, 2006

(65) Prior Publication Data

US 2006/0215736 A1    Sep. 28, 2006

Related U.S. Application Data

(60) Provisional application No. 60/662,791, filed on Mar. 18, 2005.

(51) Int. Cl.
*H04B 1/707* (2006.01)

(52) U.S. Cl. .................................. 375/142; 375/150

(58) Field of Classification Search ................. 375/130, 375/343, 340, 142, 150, E1.003; 342/420, 342/442, 453, 450
See application file for complete search history.

(56) References Cited

U.S. PATENT DOCUMENTS

| | | | |
|---|---|---|---|
| 5,265,121 A * | 11/1993 | Stewart ....................... 375/346 |
| 5,764,686 A * | 6/1998 | Sanderford et al. ......... 375/149 |
| 6,453,168 B1 * | 9/2002 | McCrady et al. ............ 455/517 |
| 6,785,321 B1 * | 8/2004 | Yang et al. ................... 375/137 |
| 7,313,164 B1 * | 12/2007 | Wilson et al. ............... 375/141 |
| 7,430,263 B1 * | 9/2008 | Batzer et al. ................ 375/367 |
| 2003/0012266 A1 * | 1/2003 | Gilmour et al. ............. 375/148 |

\* cited by examiner

*Primary Examiner*—Chieh M Fan
*Assistant Examiner*—Aristocratis Fotakis
(74) *Attorney, Agent, or Firm*—Edell, Shapiro & Finnan, LLC

(57) ABSTRACT

A technique for determining the time of arrival of a signal includes generating a spread spectrum signal with a number of code sectors, each including a periodic sequence of spread spectrum chips that corresponds to a predetermined correlation function. The periodic sequences of chips of the code sectors are shifted in time by differing amounts relative to a periodic time reference. Upon reception, the spread spectrum signal is periodically sampled, and the different code sectors produce different sampling points on the correlation function such that a number of time-shifted correlation functions results from time shifts of the code sectors. The time of arrival of the spread spectrum signal can be determined by curve fitting of the sampling points from the set of time-shifted correlation functions.

17 Claims, 13 Drawing Sheets

METHODS AND APPARATUS FOR IMPROVING SIGNAL TIMING ACCURACY

CROSS REFERENCE TO RELATED APPLICATION

This application claims priority from U.S. Provisional Patent Application Ser. No. 60/662,791 entitled "Transmit Controlled Time Shift Waveform for Improved Time-of Arrival (TOA) Measurements," filed Mar. 18, 2005. The disclosure of this provisional patent application is incorporated herein by reference in its entirety.

BACKGROUND

1. Field of the Invention

The present invention relates to methods and apparatus for accurately measuring the time of arrival of a signal and, more particularly, to enhancing accuracy of time of arrival measurements using a waveform having time-shifted sectors.

2. Description of the Related Art

Accurate determination of signal timing is desirable in a wide variety of communication and navigation applications where precise, reliable signal reception is desired. For example, state-of-the-art position location and communication systems can provide accurate, reliable three-dimensional position determination of a handheld or portable, spread spectrum communication device within milliseconds without interruption of voice or data communications. Among techniques employed to determine the position of a mobile communication device is the reception at the mobile communication device of multiple timing signals respectively transmitted from multiple transmitters at different, known locations. By determining the range to each transmitter from the arrival time of the timing signals, the mobile communication device can compute its position using trilateration. When measuring the range to an object or another device, a precise determination of the signal propagation time between the devices must be made. The signal propagation time can be derived by knowing the transmission and reception times of one or more ranging signals traveling along a direct path between the devices.

The accuracy of the position determined by these systems depends largely on the accuracy with which the receiving devices can determine the time of arrival of the ranging signals traveling along a direct path between the devices. Time-of-Arrival (TOA) measurement accuracy is directly related to the chip rate used in the transmission waveform. Higher TOA accuracy can be achieved with higher chip rates, which increases the transmission bandwidth. Correspondingly higher sampling rates are required to process these higher chip rates in the receiver. Reducing the chip rate to achieve a lower transmit bandwidth requires additional receiver processing to produce TOA accuracy similar to those achieved with the higher chip rate. Further, the TOA waveform length needs to increase as required by the Cramer-ROA bound (CRB) for TOA accuracy. The Cramer-ROA bound (CRB) for TOA accuracy is inversely proportional to bandwidth and the square-root of the operational signal-to-noise ratio. However, increasing the length of the TOA waveform at a lower chip rate requires the stability of the reference oscillators in the radio to improve to minimize frequency error between the transmitter and receiver.

Existing technologies use a delay-lock loop for code tracking or curve fitting techniques to improve the TOA measurement accuracy at lower chip rates. Code tracking with a delay-lock loop requires a feedback loop with either a voltage-controlled-oscillator (VCO) or a numeric-controlled-oscillator (NCO), whose frequency is controlled to properly track the chip timing. To provide better TOA accuracy, the frequency resolution of the VCO/NCO needs to be increased and the loop bandwidth reduced. Nonlinearities associated with the frequency control of an analog VCO approach introduce error in the TOA accuracy. For a digital design using an NCO, improved frequency resolution is achieved by increasing the NCO clock rate, which increases complexity and power consumption. Reduction in the loop bandwidth requirement requires a longer code sequence to obtain the TOA measurement, which impacts the required reference oscillator frequency stability between the transmitter and receiver.

The curve fitting approach determines the TOA measurement by curve fitting the received correlation signal samples to the expected received correlation function. To mitigate multi-path effects, a leading edge curve fitting approach can be used. The number of curve fitting samples collected across the correlation function is determined by the sampling rate. To provide TOA accuracy associated with higher chips using lower chip rates, the sampling rate at the receiver needs to be increased. Increasing the sampling rate enables the correlation function to be mapped out for an improved curve fit. TOA accuracy is improved by the improvement in the curve fitting offered by the higher sampling rate. FIG. 1 shows the received correlation samples for a sample rate four times faster than the chip rate with a −0.1 Tc (Tc=chip period) chip timing error between the transmit and received clocks. Curve fitting is performed by using the eight to ten samples centered about the correlation peak to estimate the correlation function. For leading edge curve fitting, the four to five samples before the correlation peak are used to estimate the leading edge of the correlation function. As shown in FIG. 1, the higher sampling rate provides improved resolution of the correlation function. However, increasing the sampling rate also increases the receiver complexity and its power consumption.

Thus, TOA accuracy improvements using the delay-lock loop for code tracking requires frequency resolution of the VCO/NCO to be increased and the loop bandwidth reduced. Reduction in the loop bandwidth forces a longer code sequence to obtain the TOA measurement, which impacts the required reference oscillator for frequency stability between the transmitter and receiver. These constraints make it difficult to implement the TOA algorithm with short packets in an ad-hoc network system. TOA accuracy improvements using curve fitting require high sampling rates at the receiver for estimation of the correlation function, which increases receiver complexity and power consumption.

SUMMARY

In accordance with one aspect of the invention, a method for determining the time of arrival of a signal includes generating a spread spectrum signal comprising a plurality of code sectors each having a periodic sequence of spread spectrum chips that corresponds to a predetermined correlation function, wherein the periodic sequences of chips of the code sectors are shifted in time by differing amounts relative to a periodic time reference. Upon reception, periodic sampling of the spread spectrum signal yields different sampling points on the correlation function for different code sectors such that a plurality of time-shifted correlation functions result from time shifts of the code sectors. The time of arrival of the spread spectrum signal can then be determined via curve fitting (e.g., leading-edge curve fitting) of the sampling points from the plurality of time-shifted correlation functions.

The chips of the spread spectrum signal have a pulse shape corresponding to a predetermined modulation scheme. Preferably, at least some of the chips at boundaries between adjacent code sectors have modified pulse shapes that compensate for time-shift differences between the adjacent code sectors to maintain the power spectrum and RF envelope properties of the spread spectrum signal. Either or both of the inphase (I) and quadrature (Q) sequences of chips that constitute each of the code sectors can include chips with modified pulse shapes. The same chip sequence can be used in each code sector, or different chip sequences can be employed, such that not all of the code sectors comprise the same chip sequence. Likewise, each of the code sectors can include the same number of chips, or the number of chips can vary from sector to sector.

The invention includes a transmitter, a receiver, a transceiver, and/or a system including a transmitter and receiver capable of communicating over a link. The transmitter generates a spread spectrum signal comprising a plurality of code sectors each including a periodic sequence of spread spectrum chips that correspond to a predetermined correlation function, wherein the periodic sequences of chips of the code sectors are shifted in time by differing amounts relative to a periodic time reference such that the plurality of code sectors respectively correspond to a plurality of time-shifted correlation functions. Upon reception of such a spread spectrum signal, a receiver periodically samples the spread spectrum signal to produce the plurality of time-shifted correlation functions, such that different sampling points on the correlation function are generated from different code sectors. The receiver determines a time of arrival of the spread spectrum signal via curve fitting of the sampling points from the plurality of time-shifted correlation functions.

According to another aspect of the invention, a spread spectrum signal embodied in a carrier wave includes a plurality of code sectors each comprising a periodic sequence of spread spectrum chips that corresponds to a predetermined correlation function, wherein the periodic sequences of chips of the code sectors are shifted in time by differing amounts relative to a periodic time reference such that a plurality of time-shifted correlation functions corresponding to the plurality of code sectors result from periodic sampling of the spread spectrum signal and different code sectors yield different sets of sampling points of the predetermined correlation function for determining a time of arrival of the spread spectrum signal at a receiver via curve fitting.

The above and still further features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DETAILED DESCRIPTION

The present invention employs a curve fitting technique involving time-shifted sectors of a time-of-arrival (TOA) waveform generated at the transmitter to reduce the sampling rate at the receiver, which significantly reduces receiver complexity and power consumption while maintaining high accuracy. Time-shifted sectors enable one to use curve fitting algorithms based on the full correlation function or lead-edge curve fitting algorithms to mitigate multi-path degradations. Since the TOA waveform is subdivided into sectors, the frequency stability requirement for the reference oscillators in the transmitter and receiver are reduced. By time-shifting the different sectors of the TOA waveform, the receiver obtains different sample points on the correlation function for each sector. Curve fitting is performed by using the samples for each of the time-shifted TOA sectors. Since the receiver knows the time shift for each TOA sector, the receiver is able to combine the samples from each TOA time sector in the curve fitting algorithm.

Figure 1:
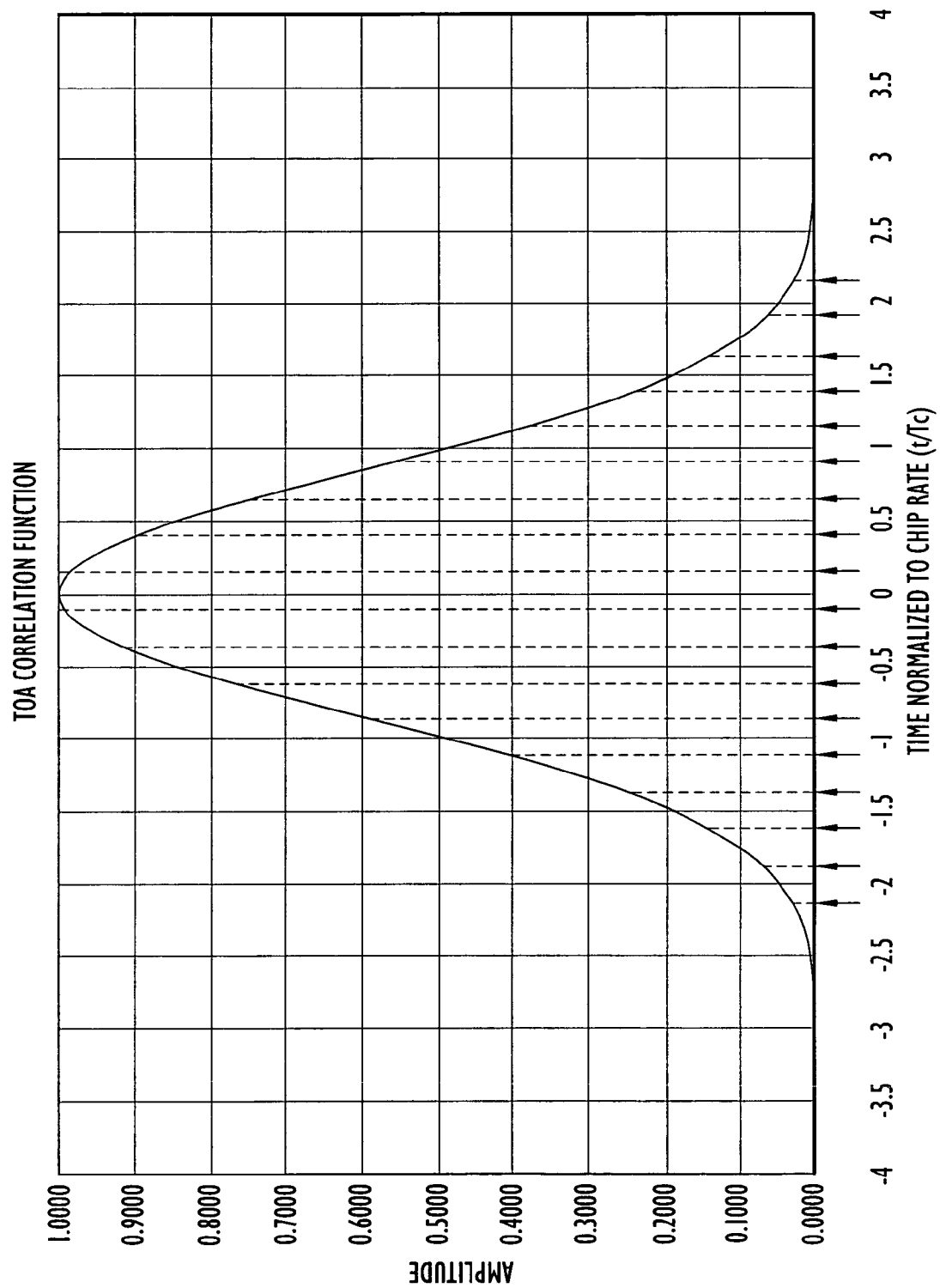
FIG. 1 is a graph of a time of arrival (TOA) correlation function showing a sampling rate that is four times faster than the chip rate.
Figure 2:
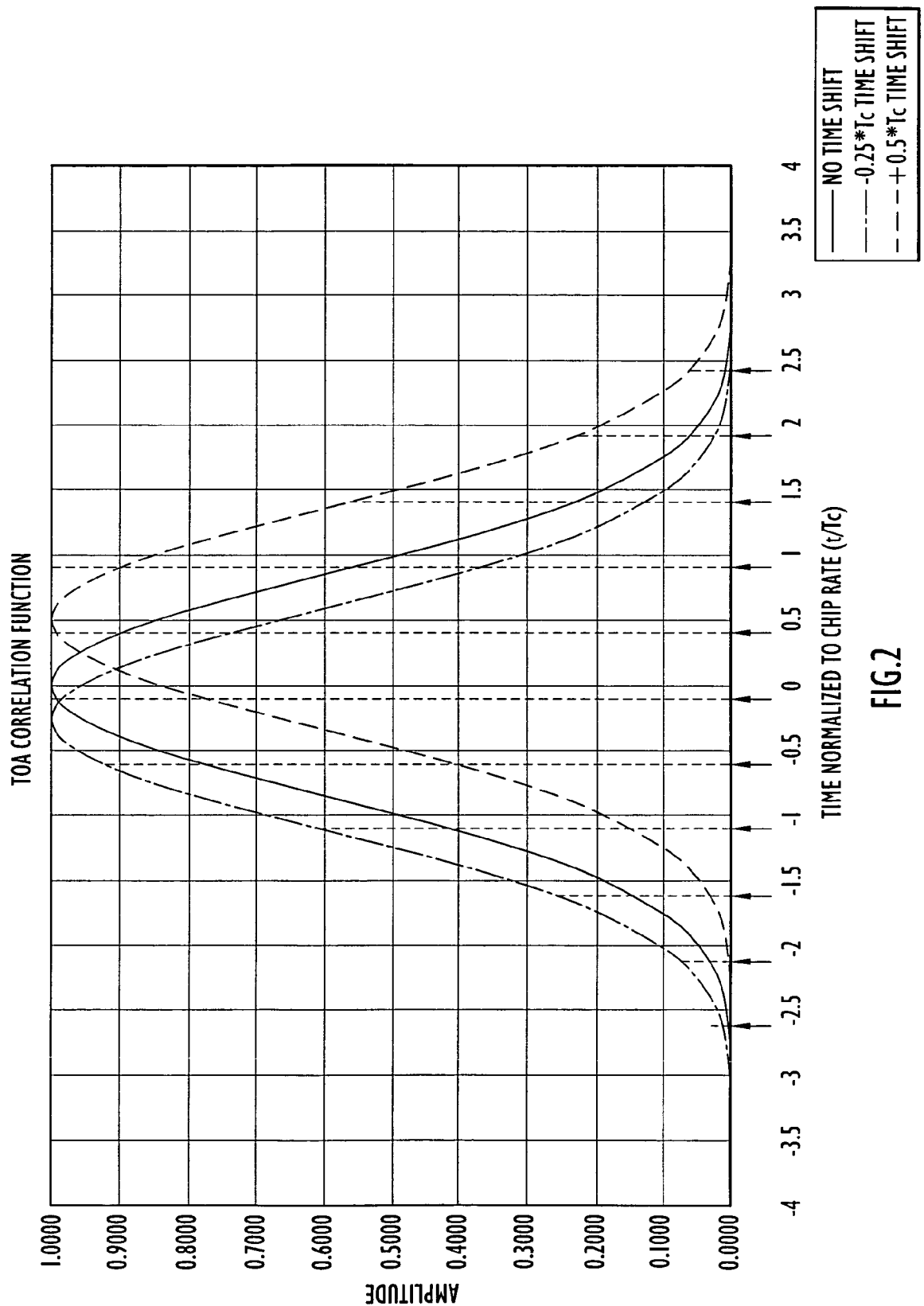
FIG. 2 is a graph of three time-shifted TOA correlation functions showing a sampling rate that is two times faster than the chip rate and illustrating the concept of obtaining additional sampling points by virtue of the time shifting of the correlation functions.

FIG. 2 shows a conceptual example of the different correlation sample points obtained for a receiver sample rate of two times the chip rate with a −0.1 $T_c$ ($T_c$=chip period) chip timing error between the transmit and receive clocks. In this example, three TOA sectors with time shifts of 0, −0.25 $T_c$, and 0.5 $T_c$ are used to obtain more details of the correlation function. As shown in FIG. 2, the time-shifted TOA sectors provide the receiver with more details of the correlation function without increasing its sampling rate. Increasing the sampling with the time-shifted TOA waveform provides increased details of the correlation function at the expense of receiver complexity and power consumption. Curve fitting is performed using, for example, the eight to ten samples centered about the correlation peak for each of the three correlation functions. For leading edge curve fitting, the three to four samples before the correlation peak for each of the three correlation functions can be used to estimate the leading edge of the correlation function.

The TOA waveform having time-shifted sectors permits a receiver to determine the time of arrival of the TOA signal with greater accuracy than with a comparable TOA waveform without time-shifted sectors. Consequently, the TOA waveform with time-shifted sectors can be used to more accurately determine the range between a transmitter and receiver, with minimal additional complexity in the transmitter and receiver, which in turn enhances the accuracy of navigation schemes supported by such range measurements. More generally, the time-shifting technique of the invention is useful in any context in which accurate determination of the time of arrival of a received signal is beneficial.

Figure 3:
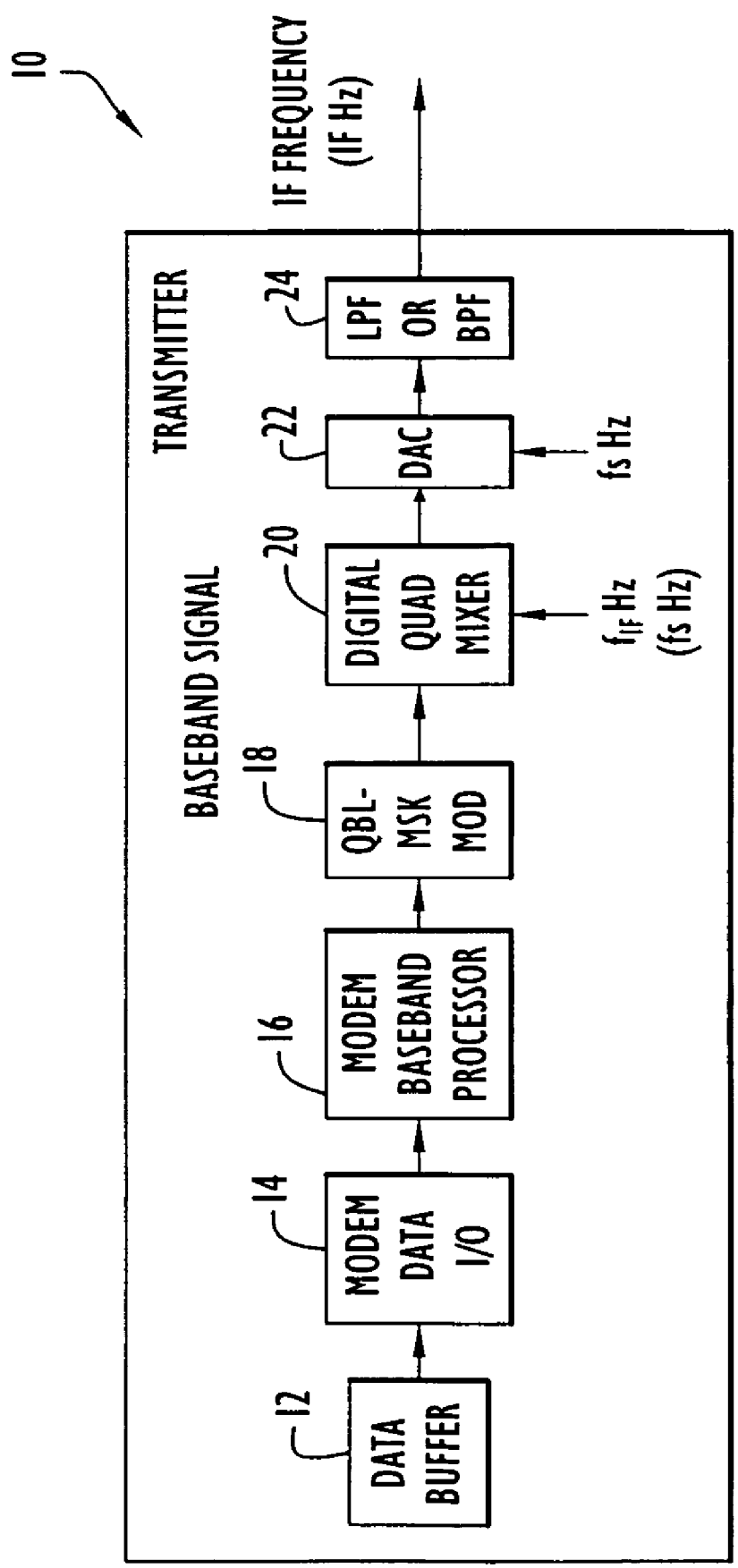
FIG. 3 is a functional block diagram of a transmitter/modulator configured to generate a TOA waveform with time-shifted sectors in accordance with an exemplary embodiment of the present invention.

A block diagram of a transmitter 10 that generates a TOA waveform with time-shifted sectors according to an exemplary embodiment of the invention is shown in FIG. 3. Transmitter 10 essentially converts an outbound digital signal to an intermediate frequency, spread spectrum signal that is subsequently up-converted to RF and transmitted via an antenna (not shown). The architecture depicted in FIG. 3 is a conceptual diagram illustrating functional units, and does not necessarily illustrate physical relationships. While a specific embodiment is shown in FIG. 3, it will be appreciated that the invention is not limited to any particular transmitter architecture, and any transmitter or modulator that generates a waveform with time-shifted sectors can be employed.

A processor (not shown) generates an initial digital signal to be transmitted, and the digital signal is buffered in data buffer 12. The transmitter's modem data I/O 14 receives the digital signal from buffer 12 and supplies the signal to a modem baseband processor 16. The digital signal contains the code and timing information for the time-shifted time of arrival (TOA) signal along with the information bits to be transmitted. Modem baseband processor 16 inserts the time-shifted TOA signal within the message signal. To minimize overhead, the time-shifted TOA signal can also be used to establish synchronization between the receiver and transmitter by incorporating it into the SYNC sequence of the transmitted waveform. By providing additional time-shifted TOA signals between the information bits in the transmitted waveform, the time accuracy can be improved by processing all the time-shifted TOA signals at the receiver. The modem baseband processor 16 can also configure the transmit waveform such that only a time-shift TOA signal is transmitted. This signal condition can be used to provide long code lengths and improved signal-to-noise ratio to enhance the time accuracy.

For transmit waveforms containing information, the modem baseband processor 16 performs modulation to convert the information bits of the input digital signal into symbols at a symbol rate of $f_{s1}$ symbols per second (sps) and also applies spread spectrum chipping to the symbols at a chipping rate $R_c$ chips per second (cps) to produce a digital baseband direct sequence spread spectrum signal comprising a stream of samples of chips. Modem baseband processor 16 may also conventionally include a convolutional encoder that applies coding to the information bits and performs an interleaving function that essentially scrambles the bits to achieve better performance. For all transmitted waveforms, each chip is then shaped by a modulator 18, such as a QBL-MSK (Quasi Band Limited Minimum Shift Keying) modulator, in accordance with the modulation scheme and supplied to a digital quad mixer 20 that digitally mixes the baseband signal with an intermediate frequency (IF) signal to up-convert the baseband signal to a digital IF signal. The digital IF signal is then converted to an analog signal by digital-to-analog converter 22 and passed through a reconstruction filter 24 comprising a low pass filter or a bandpass filter to produce an output IF signal. After up-conversion to RF, the signal is transmitted via an antenna (not shown).

As described below in greater detail, modulator 18 generates the TOA waveform such that sectors of the waveform are time shifted relative to other sectors to thereby produce a time-shifted TOA waveform. While a QBL-MSK modulator is shown in FIG. 3 for convenience, the invention is not limited to any particular type of modulator, and any suitable modulation scheme can be employed, including, but not limited to: Binary Phase Shift Keying (BPSK), Quadrature Phase Shift Keying (QPSK); Offset Quadrature Phase Shift Keying (OQPSK); Minimum Shift Keying (MSK); Raised Cosine Filtered Offset Quadrature Phase Shift Keying (RC-OQPSK); Quasi-Band Limited Minimum Shift Keying (QBL-MSK); Gaussian MSK, Tamed Frequency Modulation (TFM); Intersymbol Jitter Free Offset Quadrature Phase Shift Keying (IJF-OQPSK); and bandwidth efficient Continuous Phase Modulation (CPM) schemes.

Figure 4:
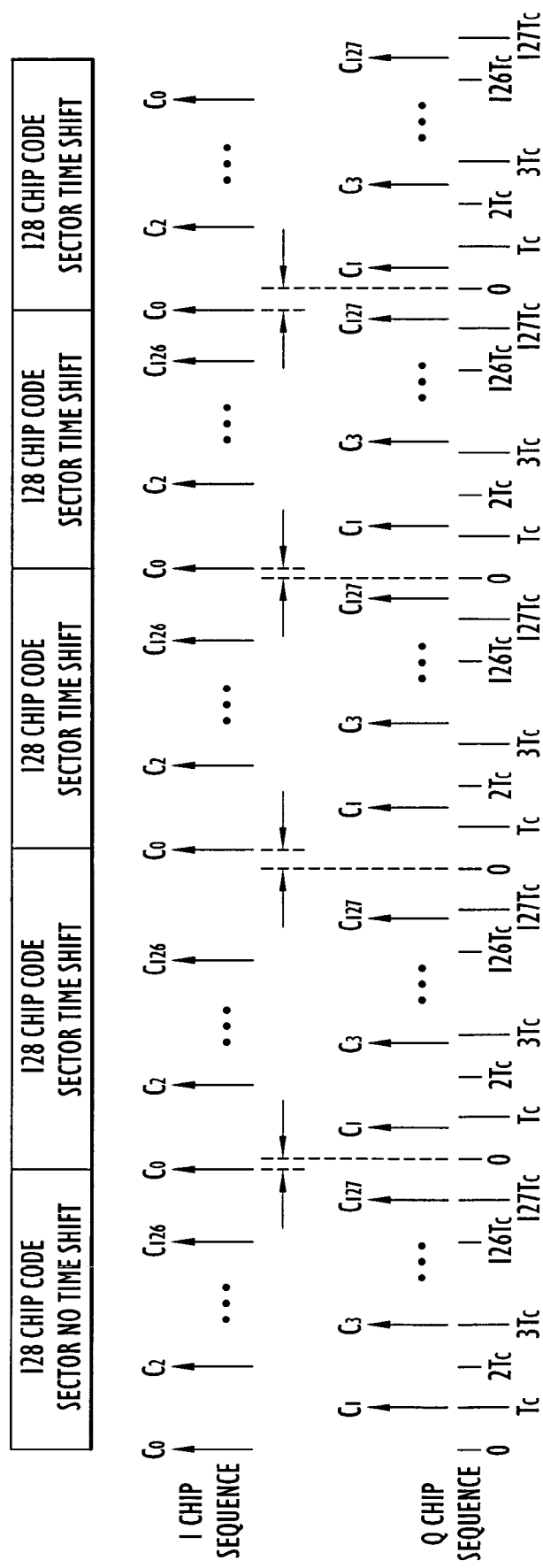
FIG. 4 is a diagram illustrating a time-shifted TOA waveform in accordance with an exemplary embodiment of the invention, wherein the chips sequences are represented as impulse functions.

According to an important aspect of the invention, time-shifted sectors of the TOA waveform at the transmitter are used to reduce the sampling rate requirement at the receiver for a high resolution TOA measurement using curve fitting. FIG. 4 shows an example TOA waveform with five sectors (the last four of which are time-shifted relative to the first sector) using a modulation format that incorporates both inphase (I) and quadrature (Q) signals. As shown in FIG. 4, the start time for the first chip ($c_0$) of the last four time sectors is time shifted from the zero time position defined by the first TOA sector. The zero time position for each sector occurs at some integer number of chip periods or receiver sampling clock cycles after the zero time position of the first sector of the TOA waveform, such that the timing of the TOA correlation function is shifted slightly differently relative to the receiver sampling clock for each sector. Within each of the four time sectors following the initial time sector, the same time shift is performed on the rest of the chips for that TOA sector, which results in the I and Q sequence for that TOA sector being shifted by the same time shift. A fixed time shift across a given length TOA sector, which in this example is 128 chips, reduces the receiver complexity. For convenience, a repeated 128 chip sequence is used to show the time-shifted TOA sectors in FIG. 4. In general, however, the chip sequence need not be the same for each sector, and the time-shifted sectors can be implemented using a unique 128 chip sequence for each time-shifted sector. Further, the chip length need not be the same for each sector, and the chip length can be different and varied for each TOA sector (e.g., not all sectors need have 128 chips). Thus, while additional details of the TOA waveform approach using a repeated 128 chip is described herein, the invention is not limited to this scheme, and unique 128 chip sequences for each time-shifted sector along with a different chip length for the TOA sector or variable length for each TOA sector can be also applied to the detailed TOA waveforms.

In FIG. 4, the time-shifted I and Q sequences are shown as consisting of a series of impulse functions. To reduce the transmission bandwidth, each of the I and Q chips can be pulse-shaped by the modulator, as noted above (e.g., modulator 18 in FIG. 3). For example, square wave (used for Offset Quadrature Phase Shift Keying, OQPSK), cosine (used for Minimum Shift Keying, MSK), raised cosine (used for Raised Cosine Filtered Offset Quadrature Phase Shift Keying, RC-OQPSK), and quasi-bandlimited (used for Quasi-bandlimited Minimum Shift Keying, QBL-MSK) pulse shaping can be used. All of these pulse-shaping types provide a given power spectrum and RF envelope properties. Within any TOA sector, for each of the I and Q chip sequences, there is a two chip period ($2T_c$) between adjacent chips. However, the time shift between each TOA sector changes the spacing between adjacent chips at the sector boundaries, such that the spacing between adjacent chips in the I and Q chip sequences at the sector boundary would be either less than or greater than $2T_c$. In order to maintain the power spectrum and RF envelope properties of the desired modulation structure, proper mapping and transition between TOA sectors needs to be provided. If one simply applied the pulse-shaping function to the I and Q chip sequences shown in FIG. 4, the power spectrum and RF envelope properties of the modulation waveform would be lost.

Figure 5:
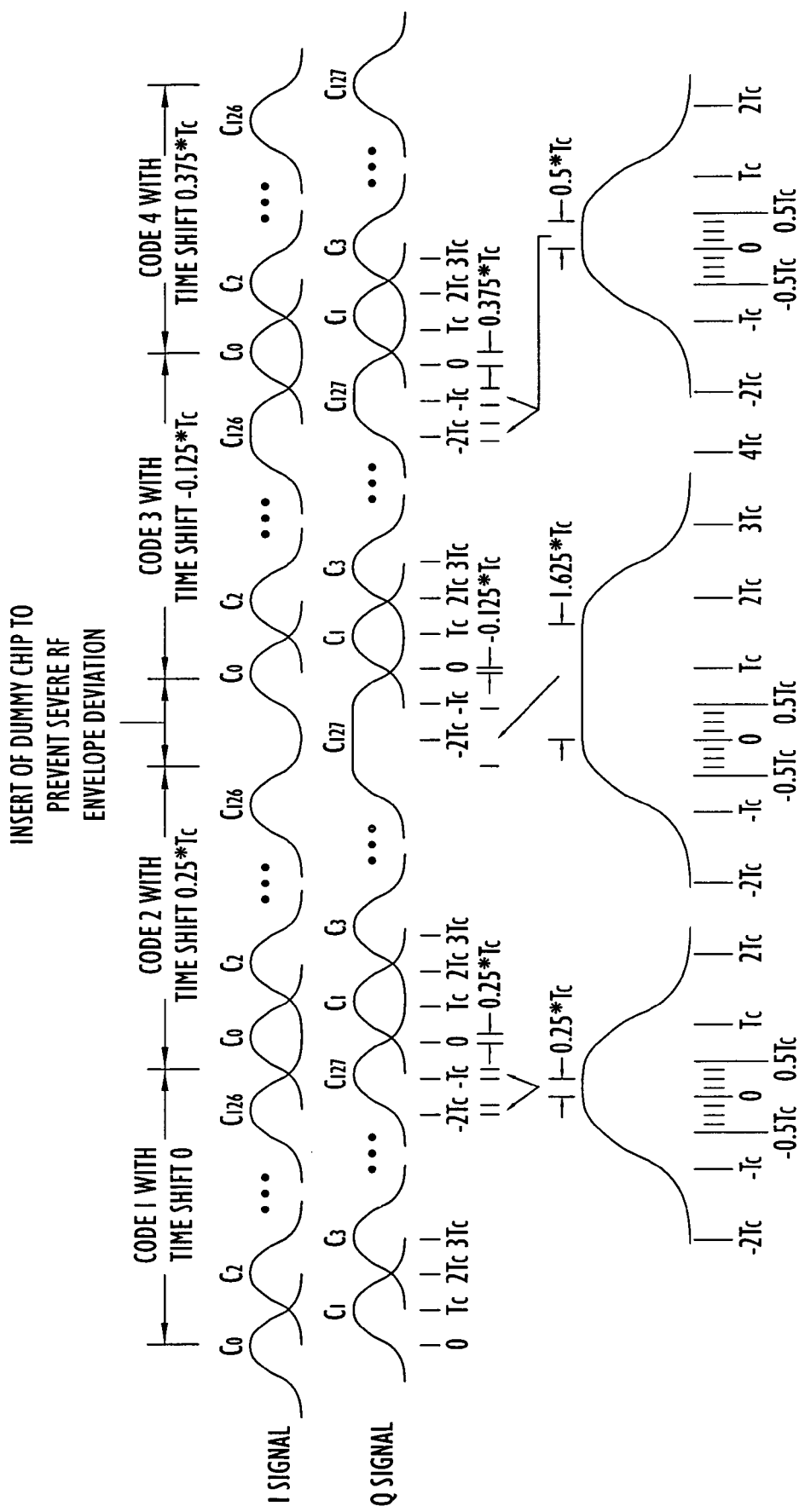
FIG. 5 is a diagram illustrating an example of a time-shifted TOA waveform using QBL-MSK modulation according to an exemplary embodiment of the invention.

As an example that illustrates this concept, FIG. 5 shows a specific mapping of a time-shifted TOA waveform for use with a QBL-MSK modulation signal. While FIG. 5 and subsequent figures show a specific modulation mapping using QBL-MSK modulation, it will be understood that the invention is not limited to any specific mapping scheme or modulation scheme. Between TOA sector 1 and 2 in FIG. 5, the 0.25 $T_c$ time shift of sector 2 results in extending the peak level of the QBL-MSK pulse-shape by 0.25 $T_c$ for the last I ($c_{126}$) and Q ($c_{127}$) chips of TOA sector 1. Unlike sector 2, which has a positive time shift of 0.25 $T_c$, sector 3 has a negative time shift of $-0.125$ $T_c$. Due to the positive-to-negative time shift between TOA sectors 2 and 3, a dummy chip is essentially added to extend the peak level of the QBL-MSK pulse-shape by 1.625 $T_c$ for only the last Q chip of TOA sector 2, thereby preserving the modulation envelope yet achieving the desired time shift. TOA sector 4 has a positive time shift of 0.375 $T_c$. Thus, the negative-to-positive time shift between TOA sectors 3 and 4 results in extending the peak level of the QBL-MSK pulse-shape by 0.5 $T_c$ for the last I and Q chips of TOA sector 3. For each TOA sector, the separation between the I and Q chips is the same based on the modulation waveform used. Between TOA sectors, the I and/or Q chips are extended in the preceding TOA sector to maintain the power spectrum and RF envelope properties of the modulation waveform. If the time-shift difference between the present TOA sector and previous TOA sector is positive, the I and Q chip pulse-shapes are extended.

As shown in FIGS. 4 and 5, the first chip ($c_0$) of each sector, other than the non-shifted first sector, is offset relative to the zero time position by some positive or negative fraction of $T_c$. Each zero time position is essentially some integer number of time periods $T_c$ (in this example, approximately 128) later than the initial zero time position, such that the receiver sampling clock can sample each sector with a different offset (i.e., the zero time position is relative to periodic sampling at the receiver). Insertion of dummy bits causes the number of integer time period $T_C$ to vary between adjacent zero time positions (e.g., from 128 $T_c$ to 129 $T_c$); however, the receiver knows the mapping being used along with the code and time-shift.

Figure 6:
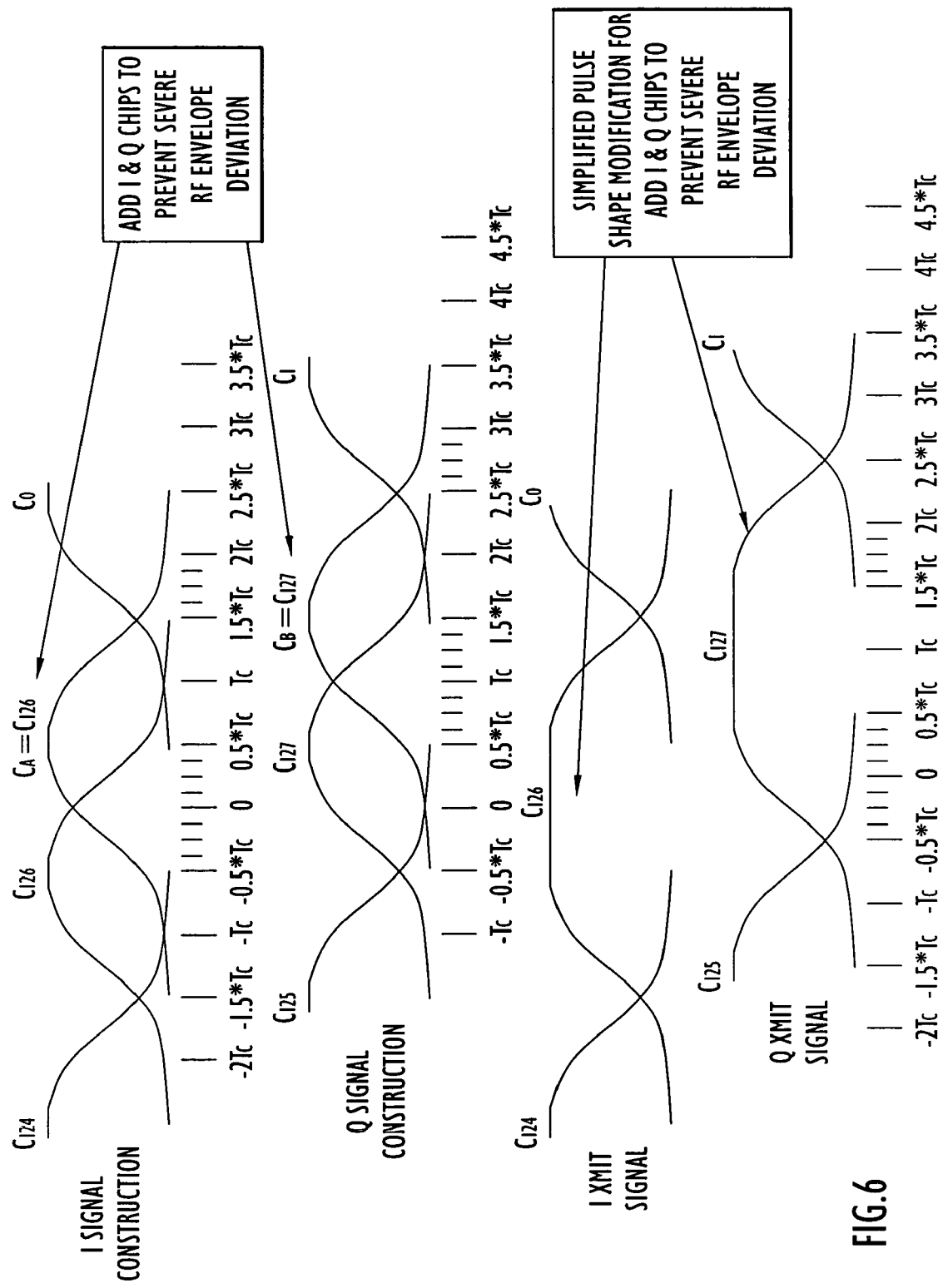
FIG. 6 is a diagram showing a time shift mapping of chips at a boundary between sectors of a time-shifted waveform in which a maximum negative-to-positive shift occurs from the preceding sector to the next sector.
Figure 7:
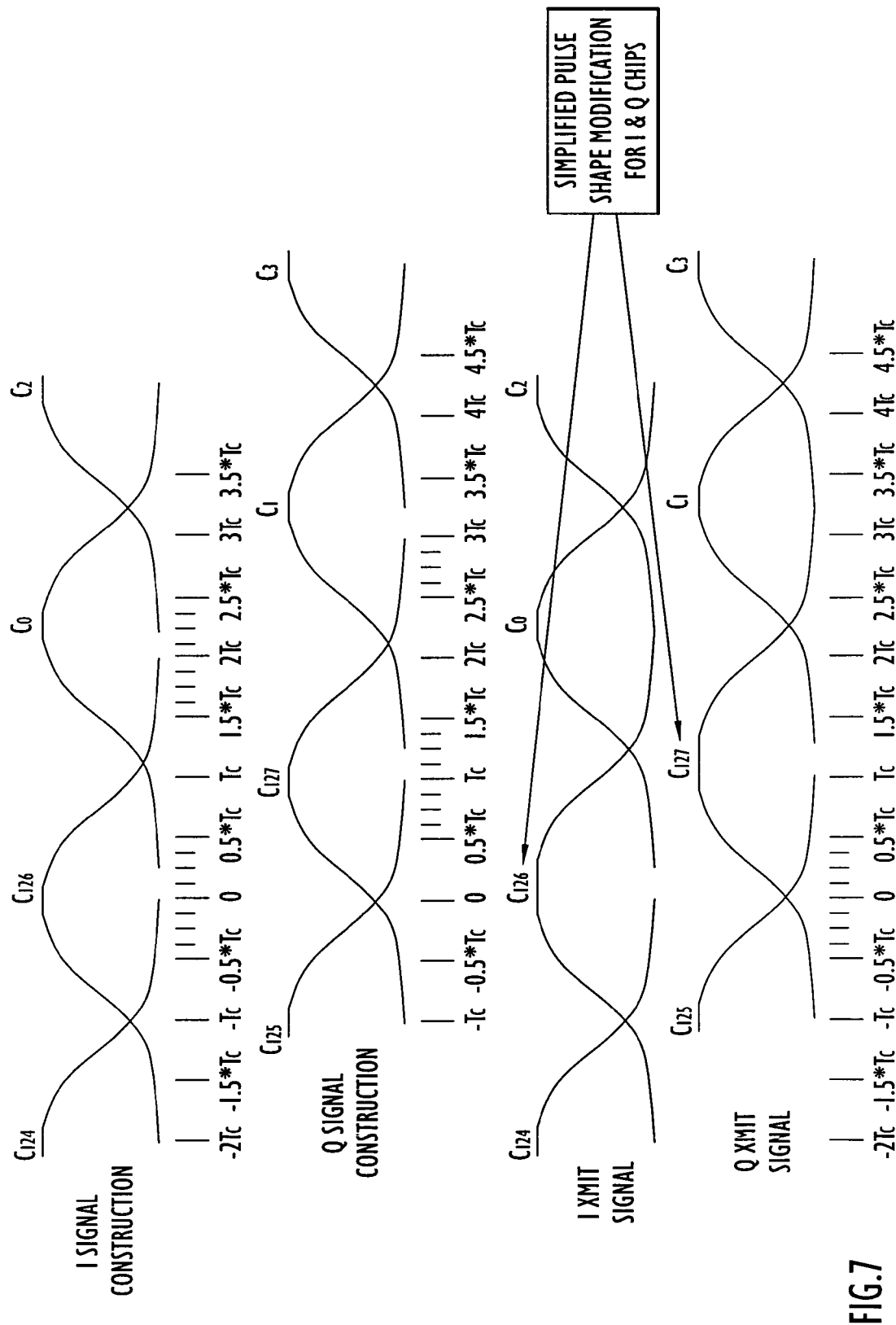
FIG. 7 is a diagram showing a time shift mapping of chips at a boundary between a sector of the TOA waveform with a zero time shift and sector of the TOA waveform with a +0.25 $T_c$ time shift.

FIG. 6 shows this I and Q chip pulse shape extension for the maximum negative time shift of $-0.5$ $T_c$ to the maximum positive time shift of $+0.5$ $T_c$ between adjacent TOA waveform sectors. FIG. 7 shows the resulting I and Q chip pulse shape extension for a time shift of zero to a positive time shift of $+0.25$ $T_c$ between adjacent TOA waveform sectors. If the time-shift difference between the present TOA sector and previous TOA sector is negative, the Q chip pulse shape is extended. In FIG. 6, the combination of a $-0.5T_c$ shift followed by a $0.5T_c$ shift in adjacent sectors would result in a gap of $3T_c$ between $c_{126}$ and $c_0$ (and also between $c_{127}$ and $c_1$). Consequently, the pulse shape of each of chips $c_{126}$ and $c_{127}$ is extended to fill in this $3T_c$ gap and restore the respective spacings with $c_0$ and $c_1$ to $2T_c$. Note this represents the maximum negative to positive shift, because the I and Q chips are offset by $T_c$ and shifting $0.5T_c$ on the I side is equivalent to shifting $-0.5T_C$ on the Q side.

Figure 8:
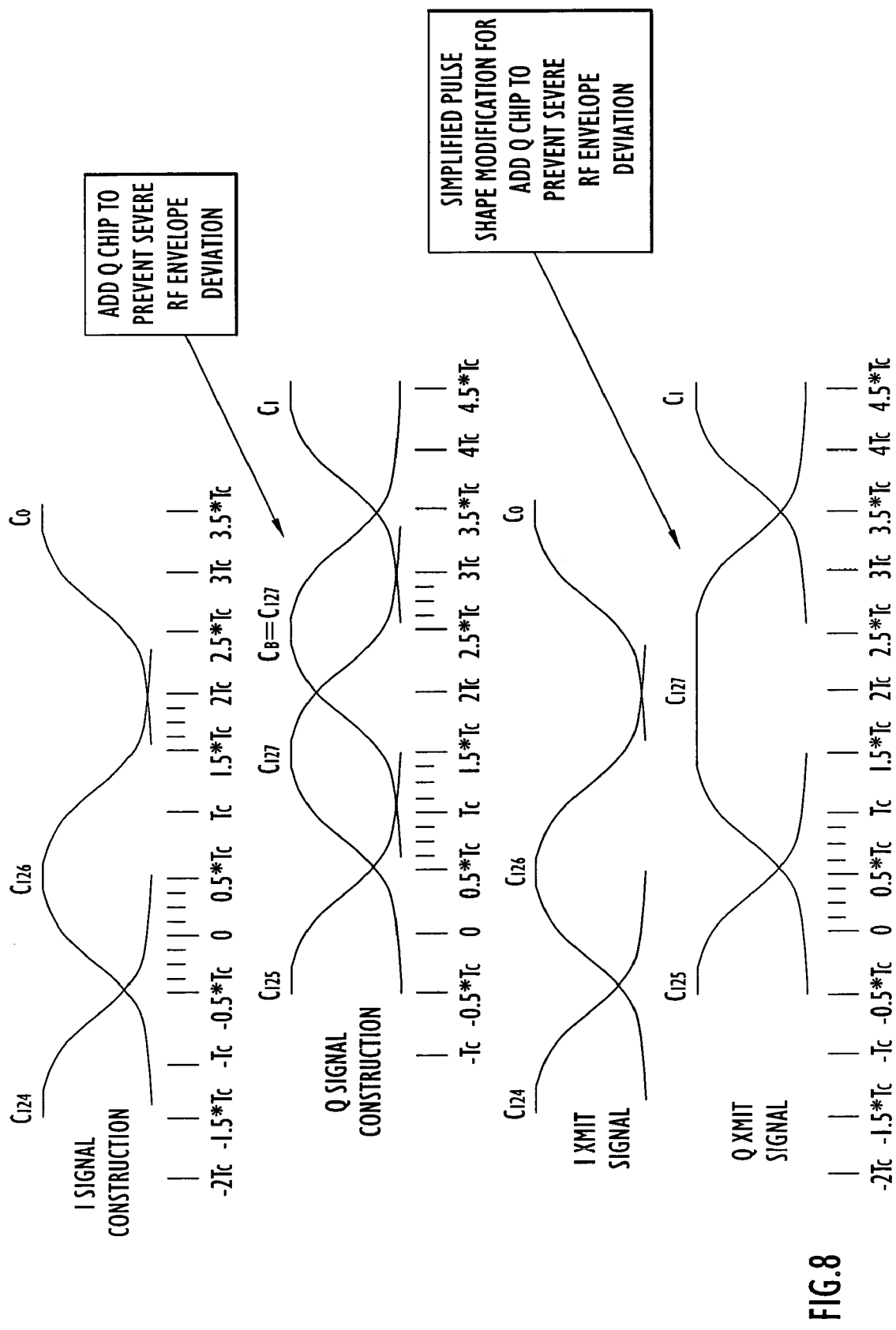
FIG. 8 is a diagram showing a time shift mapping of chips at a boundary between sectors of a time-shifted waveform in which a maximum positive-to-negative shift occurs from the preceding sector to the next sector.
Figure 9:
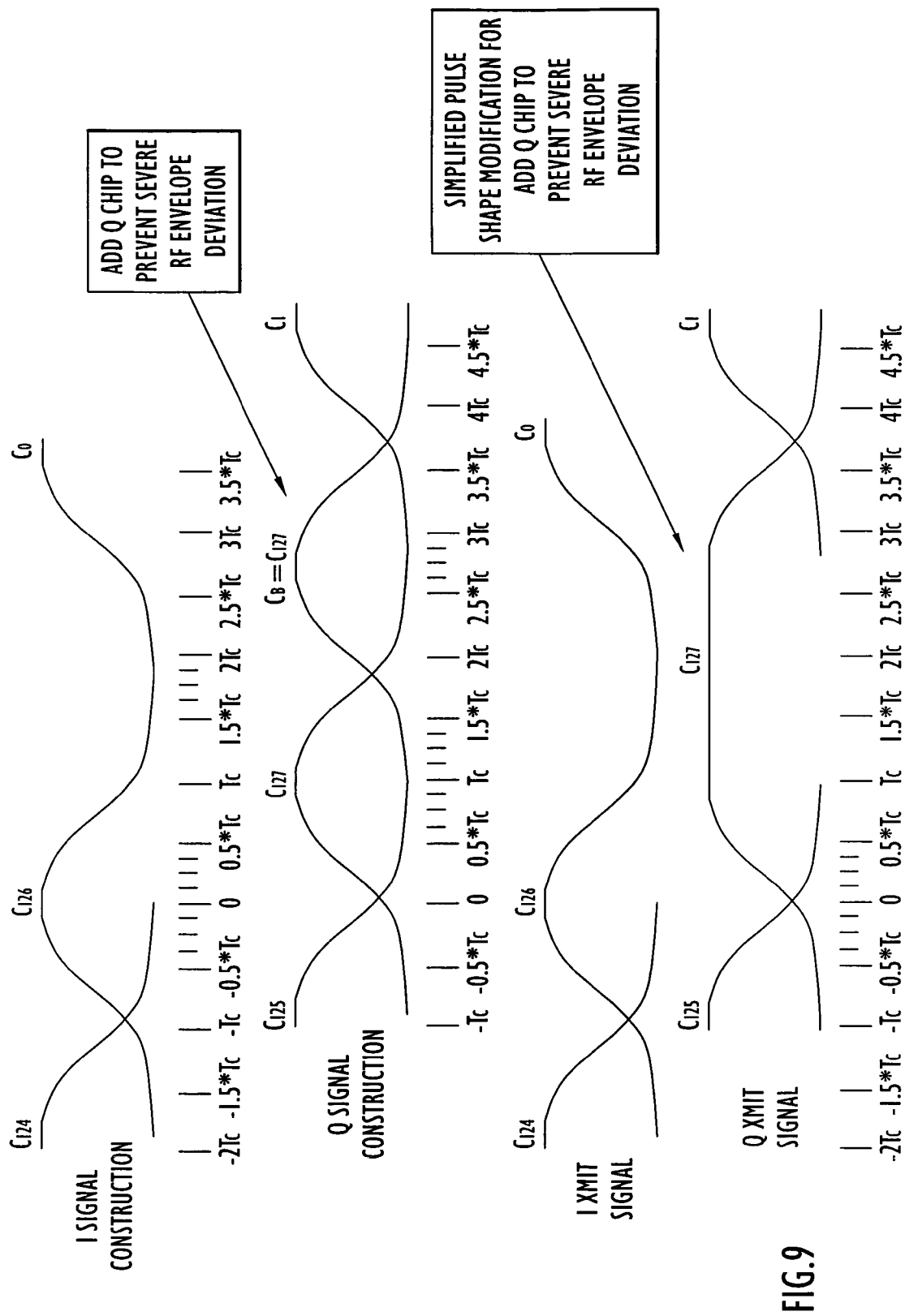
FIG. 9 is a diagram showing a time shift mapping of chips at a boundary between a sector of the TOA waveform with a zero time shift and a sector of the TOA waveform with a −0.25 $T_c$ time shift.

FIG. 8 shows the Q chip pulse shape extension for the maximum positive time shift ($+0.5$ Tc) to the maximum negative time shift ($-0.5$ Tc) for adjacent sectors of a time-shifted TOA waveform. FIG. 9 shows the resulting Q chip pulse shape extension for a time shift of zero to a negative time shift of $-0.25$ Tc between adjacent TOA waveform sectors. The mapping in FIG. 8 can be used for all time-shift differences between the present TOA sector and a previous TOA sector that are negative. Note that the spacing between chips is different for the two cases shown in FIGS. 8 and 9. In FIG. 8, this mapping requires no added $c_{126}$ I chip, since the added $C_{127}$ Q chip ensures the RF envelope does not go to zero. The example in FIG. 9 involves a different time gap, because the time-shift is from 0 to $-0.25$ $T_c$. Since this mapping uses an added Q chip to preserve the RF envelope, no I chip needs to be added.

Figure 10:
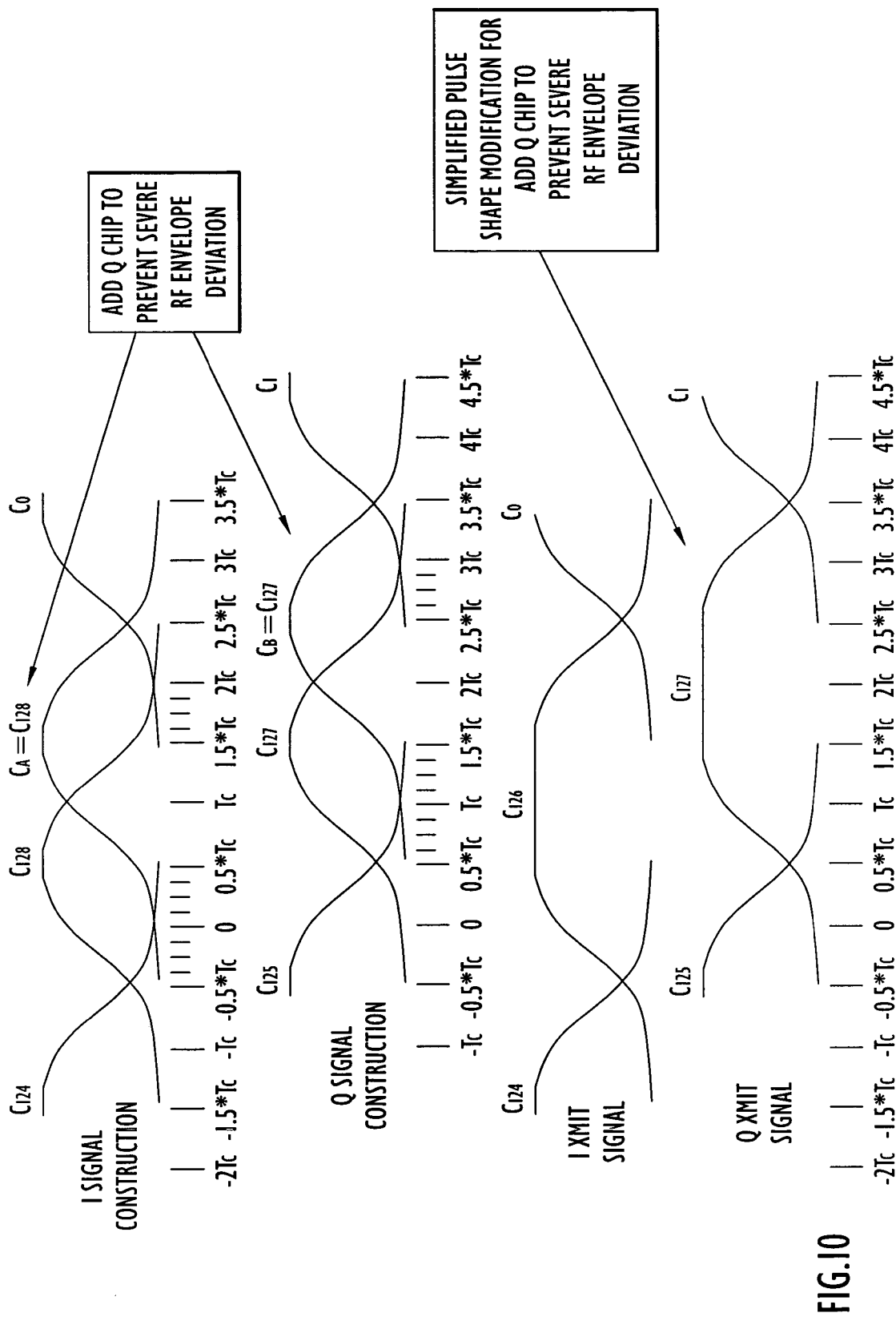
FIG. 10 is a diagram showing a modified maximum positive-to-negative time shift mapping of chips at a boundary between sectors of a time-shifted waveform.
Figure 11:
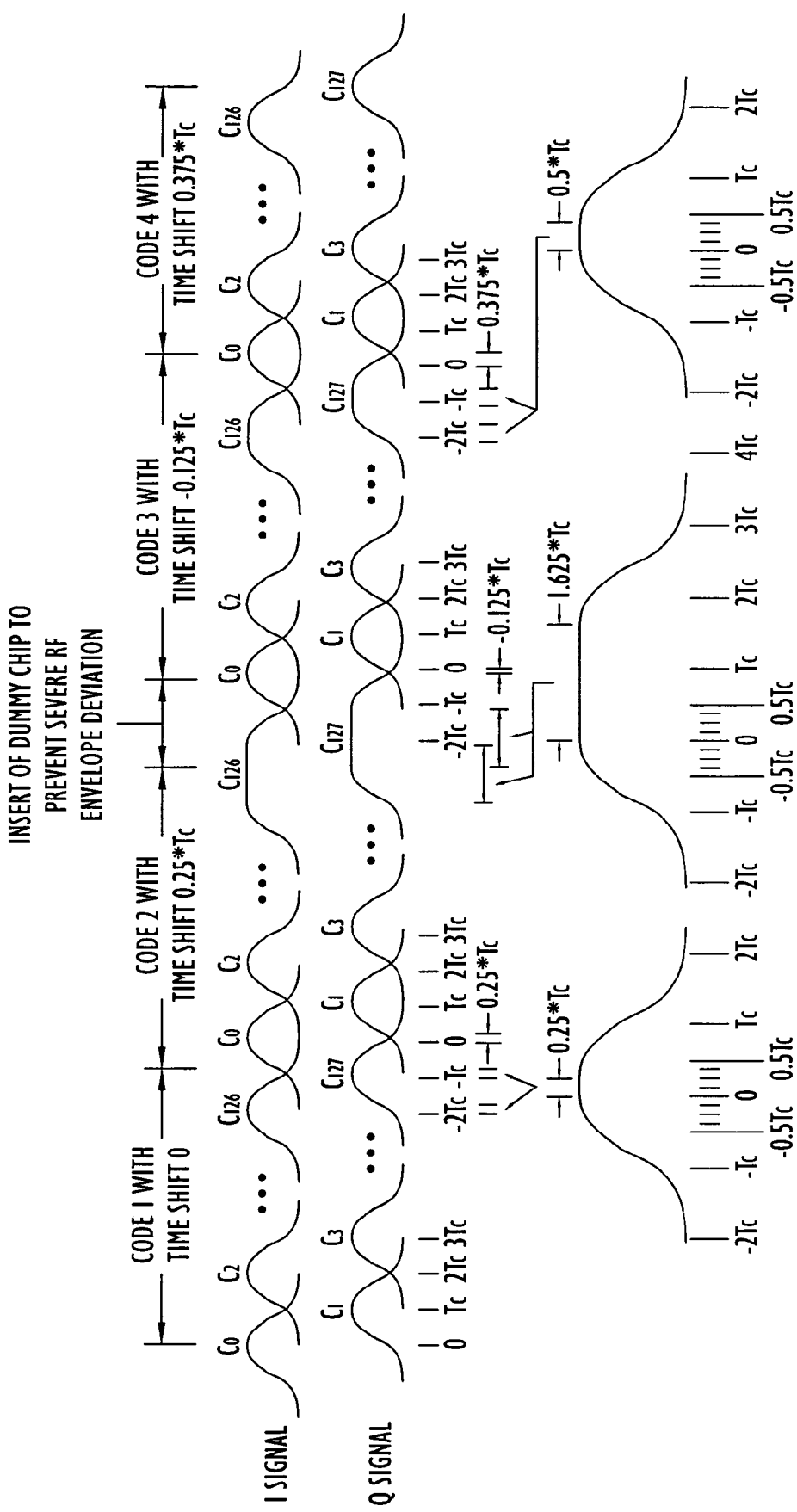
FIG. 11 is a diagram illustrating a time-shifted TOA waveform using QBL-MSK modulation with a modified time-shift mapping according to another exemplary embodiment of the invention.

One can modify this mapping by extending both the I and Q chip pulse shapes as shown in FIG. 10. FIG. 10 shows the I and Q chip pulse shape extension for the maximum positive time shift of $+0.5$ Tc to the maximum negative time shift of $-0.5$ Tc between adjacent sectors of a time-shift TOA waveform. Applying this new mapping for the negative time-shift differences between TOA sectors to the QBL-MSK modulation, results in the new QBL-MSK TOA waveform shown in FIG. 11. As shown in FIG. 11, this mapping change results in a QBL-MSK I signal change at the end of TOA sector 2 (compare with FIG. 5).

In the examples shown in FIGS. 5 and 11, since code 2 is shifted to the right by $0.25T_c$, the $c_{127}$ chip would normally be centered at a spacing of $1.25T_c$ relative to the next nominal zero time position (zero is defined on the I chips with the Q chips offset by Tc). Without the insertion of a dummy chip, a separation of only a 1.625 $T_c$ would exist between I chips $C_0$ of code 3 and $C_{126}$ of code 2, and likewise a separation of only 1.625 $T_c$ would exist between Q chips $C_1$ of code 3 and $C_{127}$ of code 2. This separation can cause severe RF envelope distortion. Insertion of a dummy chip requires the last I and Q chip to be extended by 1.625 $T_c$ ($2T_c-0.25T_c-0.125T_c=1.625T_c$), and prevents this severe RF envelope distortion. Thus, a negative time-shift requires a dummy chip to be inserted to prevent a severe RF envelope distortion. FIGS. 5 and 11 show two different possible mappings for a negative time shift. In FIG. 11, both the I and Q signals are extended (insertion of a dummy chip), while in FIG. 5 only the Q signal is extended. These figures illustrate that different mappings can be used to prevent the severe RF envelope distortion.

Thus, two possible mappings between TOA time-shift sectors have been shown for a QBL-MSK modulation waveform. These two mappings provide minimum modification to the signal structure, which minimizes complexity in the transmitter design. Many other possible mappings between the time-shifted TOA sectors could be used to implement a TOA waveform with time-shifted sectors according to the concepts of the present invention. Further, how one time-shifts the TOA sector can impact the mapping selected. For example, one could increment the time-shift by a fixed positive time shift each TOA sector, such as 0, 0.125 Tc, 0.25 Tc, and so on. For this implementation, only the positive time difference mapping is required. For many systems, the time-shift needs to be shifted between positive and negative values in a more random type fashion. Consequently, the example TOA waveforms described herein more generally demonstrate both positive and negative time shifts. For proper TOA curve fitting in the receiver, the time-shift pattern needs to be known at the receiver.

Figure 12:
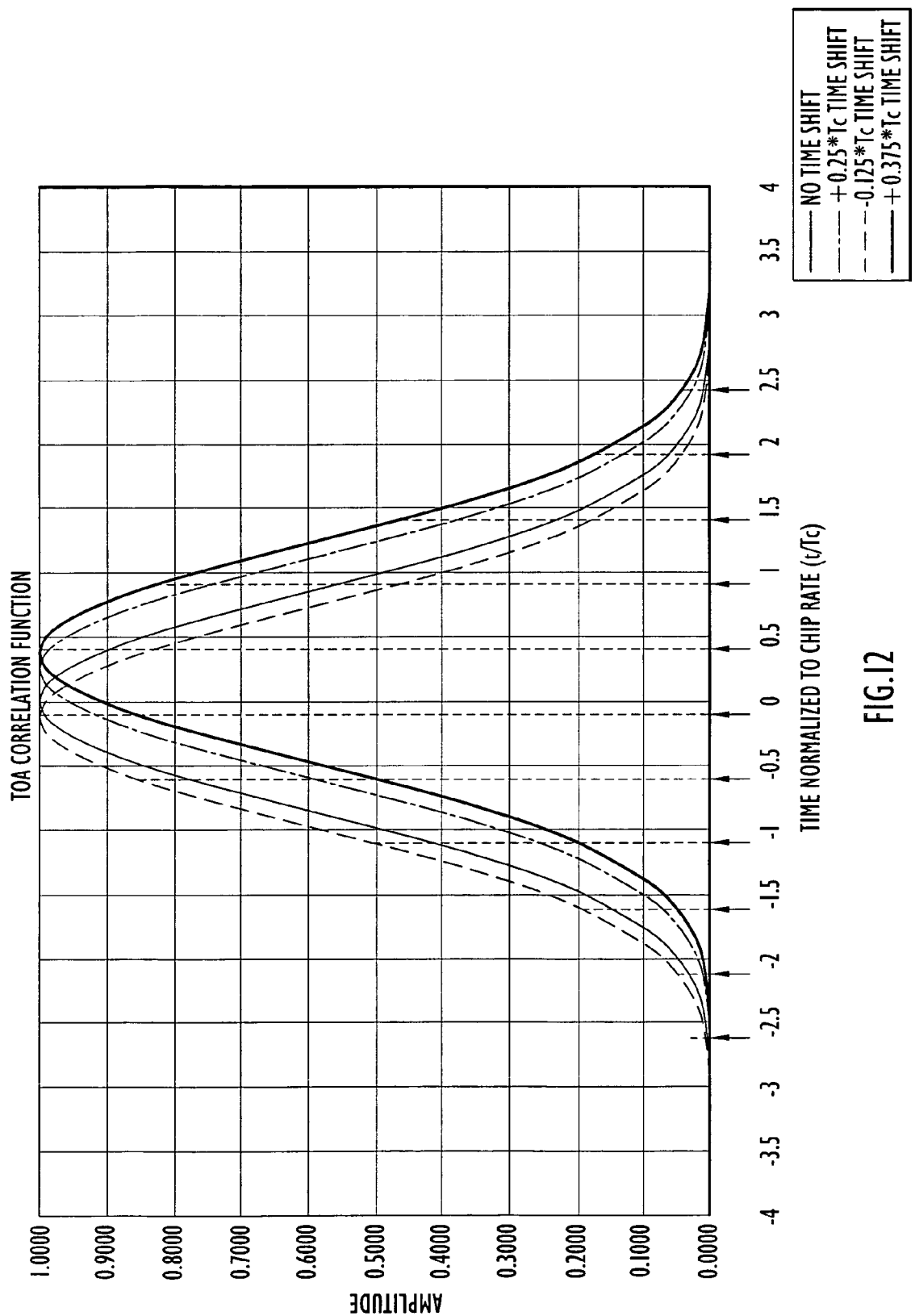
FIG. 12 is a diagram illustrating received time-shift correlation functions in accordance with an exemplary embodiment of the present invention.

At the receiver, the TOA correlation function is recovered for each of the TOA sectors using the same sampling clock. Preferably, the sampling clock operates between one and four times the chip rate to minimize receiver complexity and power consumption. However, the invention is not limited to any particular sampling clock rate. By time-shifting the different sectors of the TOA waveform, different sample points on the correlation function are obtained for each sector. Curve fitting is performed by using the samples for each of the time-shifted TOA sectors and the known time shift value for each sector. Since the receiver knows the time shift for each TOA sector, the receiver is able to combine the samples for each TOA time sector in the curve fitting algorithm. FIG. 12 shows the different correlation sample points obtained for a receiver sample rate of 2 times the chip rate with a –0.1 $T_c$ ($T_c$=chip period) chip timing error between the transmit and received clocks for the time-shifted QBL-MSK TOA waveform given in FIG. 5 and FIG. 11. The different mappings between TOA sectors should not modify the receiver correlation functions significantly, since it involves only one chip and the number of TOA chips within a sector can be equal to or greater than 128. Four TOA sectors with time shift of 0, +0.25 $T_c$, –0.125 $T_c$, and 0.375 $T_c$ are used to obtain more details of the correlation function. As shown in FIG. 12, the time-shifted TOA sectors provide the receiver more details of the correlation function without increasing its sampling rate. Increasing the sampling with the TOA time-shift TOA waveform provides increased details of the correlation function at the expense of receiver complexity and power consumption. Curve fitting is done by using, for example, the eight to ten samples center about the correlation peak for each of the three correlation functions. For leading edge curve fitting, the three to four samples before the correlation peak for each of the three correlation functions can be used to estimate the leading edge of the correlation function. The invention is not limited to any particular number of samples to be used in performing curving fitting or leading-edge curve fitting.

An important aspect of the invention is the capability to reduce the receiver sampling rate for TOA measurements, while achieving TOA accuracies associated with higher receiver sampling rates. The time-shifting property can also be used for enhancing SYNC detection performance for receivers operating at sampling rates close to the chip rate. Time-shifting can also be used to change the waveform structure for spread signals at symbol boundaries or even at chip boundaries. As shown above, time-shifting can be applied to a QBL-MSK modulation waveform using different mapping techniques. These mapping techniques and others can be used to apply time shifting to Binary Phase Shift Keying (BPSK), Quadrature Phase Shift Keying (QPSK), Offset Quadrature Phase Shift Keying (OQPSK), Minimum Shift Keying (MSK), Gaussian MSK, Quasi-bandlimited Minimum Shift Keying (QBL-MSK), Tamed Frequency Modulation (TFM), Intersymbol Jitter Free Offset Quadrature Phase Shift Keying (IJF-OQPSK), Raised Cosine Filtered Offset Quadrature Phase Shift Keying (RC-OQPSK), and bandwidth efficient Continuous Phase Modulation (CPM) schemes.

Figure 13:
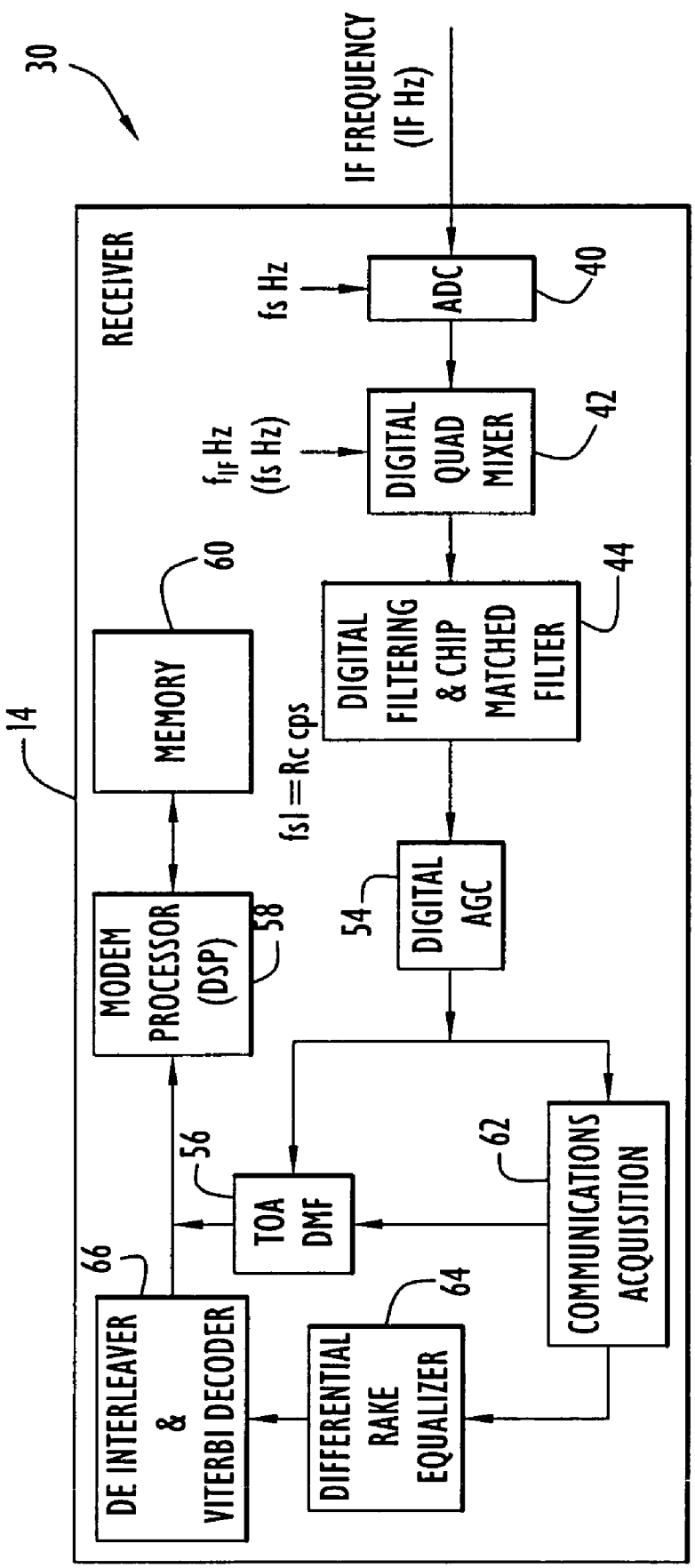
FIG. 13 is a functional block diagram of a receiver/demodulator configured to receive a TOA waveform with time-shifted sectors in accordance with an exemplary embodiment of the present invention.

An exemplary embodiment of a receiver 30 for processing the TOA waveform of the present invention is shown in FIG. 13. The receiver 30 shown in FIG. 13 can be configured to process the spread spectrum signal at the chip rate generated by the transmitter 10 shown in FIG. 3. In a two-way communication system, each communication device can include a modem or transceiver that includes both a transmitter and a receiver, such as those described herein.

Receiver 30 processes a received signal after down-conversion to IF and essentially recovers the transmitted waveform and information contained therein. An analog-to-digital converter 40 converts the IF signal to a digital IF signal at a sampling rate of $f_s$. Digital quad mixer 42 down-converts the digital IF signal to baseband, and the sample rate of the digital baseband signal is adjusted from $f_s$ to $f_{s1}$ by digital filtering and chip matched filter 44.

In the exemplary receiver section of the modem shown in FIG. 13, the system is capable of receiving communication signals (e.g., data, audio/voice, video, etc.) interleaved with time-of-arrival ranging signals (i.e., the TOA waveform with time-shifted sectors) used for navigation or just time-of-arrival ranging signals with no information signal interleaved within it. Thus, after applying gain control to the digital baseband received signal in digital automatic gain control (AGC) module 54, the signal is supplied both to a communications acquisition module 62 and a time-of-arrival digital matched filter (TOA DMF) module 56. When either a communication signal or a TOA ranging waveform is received, the communication acquisition module 62 acquires the timing of the signal. The TOA DMF module 56 operates at the same time as the communications acquisition module when the TOA signal is part of the SYNC section of the waveform. Once SYNC is detected, the TOA DMF correlation data for the received time-shifted TOA signals is sent to modem processor 58, which determines the time of arrival of the TOA signal using curve fitting or leading-edge curve fitting in the manner described above. In the case of a TOA ranging signal following the SYNC section, the communications acquisition module triggers the TOA DMF module 56 to precisely determine the time of arrival of the ranging pulse. Once the TOA DMF module 56 correlates the ranging signal by matching the signal with the appropriate correlation function, the resulting signal timing information is sent to the modem processor 58 (supported by memory 60), which determines the time of arrival of the TOA signal using curve fitting or leading-edge curve fitting in the manner described above. Using the TOA measurement, processor 58 can determine the range between the transmitter and receiver, which in turn can be used with other such range measurements to determine the receiver position.

For communication signals, the acquired signal is supplied from the communications acquisition module 62 to a differential rake equalizer 64 that identifies the predominant multipath channels and sums the multipath signals appropriately time-delayed to increase the combined signal-to-noise ratio for communications performance improvement. A de-interleaver and Viterbi decoder 66 essentially decodes and deinterleaves (descrambles) the coding and interleaving functions applied in the modem baseband processor when information is communicated with the TOA signal. The resulting digital information signal is then supplied to modem processor 58 where the final bits are accumulated and supplied to a destination application (e.g., a data, voice or video application).

As previously noted, the TOA waveform with time-shifted sectors can be used in navigation, and can be embodied as ranging pulses used to determine the position of a communication device or the range to another device or object by precisely measuring time of arrival. For example, the TOA signals can be used in a system that employs a two-way, round-trip ranging message scheme in which the time of arrival of the ranging messages is accurately determined to yield accurate range estimates used to calculate the position of a mobile radio via trilateration. A master mobile radio transmits outbound ranging messages to plural reference radios. The reference radios respond by transmitting reply ranging messages each indicating the location of the reference radio. Upon reception of the reply ranging message, the master radio determines the signal propagation time, and hence range, by subtracting a known turn around time (i.e., the time between reception of the outbound ranging message and the transmission of the reply ranging message) and internal processing delays from the elapsed time between transmission of the outbound ranging message and the time of arrival of the reply message. The brief TOA messages can be interleaved with voice and data messages in a non-intrusive manner to provide position location capabilities without disruption of voice and data communications. For example, a messaging protocol similar to that used in Carrier Sense Multiple Access with Collision Avoidance (CSMA/CA) can be used. Likewise, the time-shifted TOA waveform techniques of the present invention can be used in one-way ranging schemes, such as in transmission of GPS signals.

The time-shifted TOA waveform of the present invention can be implemented in a system that easily fits within the physical footprint of a mobile communication device, such as a handheld spread spectrum radio, permitting the system to be used in a wide variety of applications. Where the system supports both communications and navigation, as in the exemplary embodiment, the system can be used to provide situation awareness in military exercises, to determine and track the location of military personnel and/or equipment during coordination of field operations. This would be particularly useful in scenarios where GPS signals are weak or unavailable due to atmospheric conditions, terrain or location of the radio inside a building, or to augment and enhance the accuracy of GPS position information. The position information can be used by a commander to dynamically map the current position of personnel and equipment and to coordinate further movements. Further, individual mobile radios can receive and display position information for other related personnel, so that soldiers in the field are provided with situation awareness for their immediate surroundings.

The technique of the present invention can also be used to enhance systems that locate and track non-military personnel and resources both indoors or outdoors, including but not limited to: police engaged in tactical operations; firefighters located near or within a burning building; medical personnel and equipment in a medical facility or en route to an emergency scene; and personnel involved in search and rescue operations. The technique is also useful in systems used to track high-value items by tagging items or embedding a mobile radio in items such as personal computers, laptop computers, portable electronic devices, luggage (e.g., for location within an airport), briefcases, valuable inventory, and stolen automobiles.

In urban environments, where conventional position determining systems have more difficulty operating, the invention can be used to support systems that track fleets of commercial or industrial vehicles, including trucks, buses and rental vehicles equipped with mobile radios. Tracking of people carrying a mobile communication device is also desirable in a number of contexts, including, but not limited to: children in a crowded environment such as a mall, amusement park or tourist attraction; location of personnel within a building; location of prisoners in a detention facility; or to track the movements of parolees. The mobile radio could be carried on the body by incorporating the radio into clothing, such as a bracelet, a necklace, a pocket or the sole of a shoe. The invention can also be applied in systems used in locating the position of cellular telephones. This capability could also be used to assist in cell network management (e.g., in cell handoff decisions).

Having described preferred embodiments of new and improved methods and apparatus for enhancing accuracy of time of arrival measurements with a time-shift waveform, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A method for determining the time of arrival of a signal, comprising:
   (a) generating a spread spectrum signal comprising a plurality of code sectors each including a periodic sequence of spread spectrum chips that correspond to a predetermined correlation function, wherein the periodic sequences of chips of the code sectors are shifted in time by differing amounts relative to a periodic time reference;
   (b) receiving the spread spectrum signal, wherein periodic sampling of the spread spectrum signal yields different sampling points on the correlation function for different code sectors such that a plurality of time-shifted correlation functions result from time shifts of the code sectors; and
   (c) determining a time of arrival of the spread spectrum signal via curve fitting of the sampling points from the plurality of time-shifted correlation functions.

2. The method of claim 1, wherein (c) includes performing leading-edge curve fitting using samples occurring before a peak of the correlation function.

3. The method of claim 1, wherein the chips of the spread spectrum signal have a pulse shape corresponding to a predetermined modulation, and wherein at least some of the chips at boundaries between adjacent code sectors have modified pulse shapes that compensate for time-shift differences between the adjacent code sectors to maintain a power spectrum and RF envelope properties of the spread spectrum signal.

4. The method of claim 1, wherein the spread spectrum signal includes a periodic sequence of inphase (I) chips and a period sequence of quadrature (Q) chips.

5. The method of claim 1, wherein each of the code sectors includes the same chip sequence.

6. The method of claim 1, wherein not all of the code sectors comprise the same chip sequence.

7. The method of claim 1, wherein each of the code sectors includes the same number of chips.

8. The method of claim 1, wherein not all of the code sectors comprise the same number of chips.

9. A system for determining the time of arrival of a signal, comprising:
- a transmitter configured to generate a spread spectrum signal comprising a plurality of code sectors each including a periodic sequence of spread spectrum chips that correspond to a predetermined correlation function, wherein the periodic sequences of chips of the code sectors are shifted in time by differing amounts relative to a periodic time reference such that the plurality of code sectors respectively correspond to a plurality of time-shifted correlation functions; and
- a receiver configured to periodically sample the spread spectrum signal to produce the plurality of time-shifted correlation functions, such that different sampling points on the correlation function are generated from different code sectors, the receiver determining a time of arrival of the spread spectrum signal via curve fitting of the sampling points from the plurality of time-shifted correlation functions.

10. An apparatus for receiving a signal, comprising:
- a receiver configured to receive a spread spectrum signal comprising a plurality of code sectors each including a periodic sequence of spread spectrum chips that corresponds to a predetermined correlation function, wherein the periodic sequences of chips of the code sectors are shifted in time by differing amounts relative to a periodic time reference, and periodic sampling of the spread spectrum signal by the receiver yields different sampling points on the predetermined correlation function for different code sectors such that a plurality of time-shifted correlation functions are generated from time shifts of the code sectors; and
- a processor configured to determine a time of arrival of the spread spectrum signal via curve fitting of the sampling points from the plurality of time-shifted correlation functions.

11. The apparatus of claim 10, wherein the processor performs leading-edge curve fitting using samples occurring before a peak of the correlation function.

12. The apparatus of claim 10, wherein the receiver is configured to receive the spread spectrum signal with chips having a pulse shape corresponding to a predetermined modulation, wherein at least some of the chips at boundaries between adjacent code sectors have modified pulse shapes that compensate for time-shift differences between the adjacent code sectors to maintain a power spectrum and RF envelope properties of the spread spectrum signal.

13. The apparatus of claim 10, wherein the receiver is configured to receive the spread spectrum signal with a periodic sequence of inphase (I) chips and a period sequence of quadrature (Q) chips.

14. The apparatus of claim 10, wherein the receiver is configured to receive the spread spectrum signal with each of the code sectors having the same chip sequence.

15. The apparatus of claim 10, wherein the receiver is configured to receive the spread spectrum signal with not all of the code sectors having the same chip sequence.

16. The apparatus of claim 10, wherein the receiver is configured to receive the spread spectrum signal with each of the code sectors having the same number of chips.

17. The apparatus of claim 10, wherein the receiver is configured to receive the spread spectrum signal with not all of the code sectors having the same number of chips.

* * * * *